US012036645B2

(12) United States Patent
Guisasola et al.

(10) Patent No.: US 12,036,645 B2
(45) Date of Patent: Jul. 16, 2024

(54) DEVICE FOR TENSIONING A CONNECTING ELEMENT

(71) Applicant: Caterpillar Energy Solutions GmbH, Mannheim (DE)

(72) Inventors: Inigo Guisasola, Landau (DE); Daniela Ehlers, Mannheim (DE); Michael Weitzel, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 485 days.

(21) Appl. No.: 17/416,978

(22) PCT Filed: Dec. 20, 2019

(86) PCT No.: PCT/EP2019/025473
§ 371 (c)(1),
(2) Date: Jun. 21, 2021

(87) PCT Pub. No.: WO2020/126096
PCT Pub. Date: Jun. 25, 2020

(65) Prior Publication Data
US 2022/0072688 A1    Mar. 10, 2022

(30) Foreign Application Priority Data
Dec. 21, 2018  (GB) ...................... 1821017

(51) Int. Cl.
*B25B 29/02* (2006.01)
*F16B 31/04* (2006.01)
(52) U.S. Cl.
CPC ............ *B25B 29/02* (2013.01); *F16B 31/043* (2013.01)

(58) Field of Classification Search
CPC ....... B25B 29/02; B23P 19/067; F16B 31/043
See application file for complete search history.

(56) References Cited

U.S. PATENT DOCUMENTS 3,008,362 A * 11/1961 Tucker, Jr. .............. B25B 29/02
92/151
4,074,890 A    2/1978 Boudet et al.
(Continued)

FOREIGN PATENT DOCUMENTS

CN      102120296 A    7/2011
CN      102267050 B    4/2013
(Continued)

OTHER PUBLICATIONS

International Search Report related to Application No. PCT/EP2019/025473; dated Mar. 27, 2020.
(Continued)

*Primary Examiner* — David B. Thomas (57) ABSTRACT

The present invention refers to a device for tensioning a connecting element fastened to a component to be tightened, which comprises an engagement element having an engagement section receiving and holding the connecting element, a support element configured to support the device against the component, and an actuating unit having a fluid chamber for receiving a fluid, wherein the actuating unit is configured to manipulate a volume of the fluid chamber so as to move the engagement element relative to the support element. The device further comprises a vent opening fluid-communicatively connectable to the fluid chamber which is disposed in the region of the engagement section.

13 Claims, 2 Drawing Sheets

(56) References Cited

U.S. PATENT DOCUMENTS

| | | | |
|---|---|---|---|
| 4,725,176 | A | 2/1988 | Connolly et al. |
| 5,390,569 | A | 2/1995 | Odsberg et al. |
| 5,715,861 | A | 2/1998 | Williams |
| 8,302,509 | B2 | 11/2012 | Hohmann et al. |
| 8,667,789 | B2 | 3/2014 | Thelen et al. |
| 9,289,888 | B2 * | 3/2016 | Kästner ................. B23P 19/067 |
| 11,207,767 | B2 * | 12/2021 | Guisasola ............... B25B 29/02 |
| 2011/0192257 | A1 | 8/2011 | Armstrong |
| 2013/0087022 | A1 | 4/2013 | Kästner |
| 2015/0263472 | A1 | 9/2015 | Sneath |

FOREIGN PATENT DOCUMENTS

| | | | |
|---|---|---|---|
| DE | 2625407 | B1 | 11/1977 |
| EP | 0200459 | A2 | 11/1986 |
| GB | 2261029 | A | 5/1993 |
| GB | 2553149 | A | 2/2018 |
| SU | 569447 | A1 | 8/1977 |
| WO | 2017016654 | A1 | 2/2017 |

OTHER PUBLICATIONS

Great Britain Search Report related to Application No. 1821017.9; dated Jun. 12, 2019.

* cited by examiner

DEVICE FOR TENSIONING A CONNECTING ELEMENT

This patent application is a 35 USC § 371 U.S. national stage of International Application No, PCT/EP2019/025473 filed on Dec. 20, 2019, which claims the benefit and priority of Great Britain Application No. 1721017.9 filed on Dec. 21, 2018, the disclosures of which are incorporated in their entirety by reference herein.

TECHNICAL FIELD

The present invention refers to a device for tensioning and/or loosening a tensable connecting element, such as a screw connection, fastened to a component to be tightened or loosened.

TECHNOLOGICAL BACKGROUND

Tensable connecting elements, such as tensable screw connections, for tightening or connecting components are well known. Specifically, for installing such tensable connecting elements, the use of screw tensioning devices is known, for example, in the field of steel constructions and various engine design applications. These screw tensioning devices generally operate based on a torque-free tensioning method, according to which pulling forces are used to lengthen large screws or bolts in an elastic range during installation such that, upon releasing the pulling forces, the connecting elements retract and thereby apply tensional forces onto the components to be tightened.

For example, in a known use of the screw tensioning devices, at first, a first end of a screw is connected to a first component via a threaded means. Then, a second component to be fastened to the first component is provided such that a threaded rod of the screw extends therethrough. Via a second end of the screw, a nut is placed on the screw so as to be engaged with the threaded rod. Thereafter, the second end of the screw is engaged with the screw tensioning device and a pulling force is applied thereto so as to elastically lengthen the screw. In this lengthened state, the nut is further tightened such that, upon releasing the pulling force applied to the screw, the screw together with the nut apply a tensional force for frictional connecting the first to the second component.

Such a screw tensioning device, for example, is known from US 2018/0215022 A1. In the known device, hydraulically induced pulling forces are used for tensioning a screw connecting element engaged with a fixation element of the device. Specifically, the known device comprises a support element configured to support the fixation element against a component to be tightened during tensioning operation. The fixation element is arranged to be movable relative to the support element so as to apply tension or to remove tension from the screw. Further, a piston is provided which is accommodated and movable within the fixation element along a longitudinal axis of the device. For hydraulically actuating the fixation element, a hydraulic chamber containing a fluid is delimited by and provided in a space between the piston, the fixation element and the support element. In this configuration, the piston is arranged such that a movement thereof relative to the fixation element manipulates a volume of the fluid chamber and thereby translationally actuates the fixation element relative to the support element.

Specifically, the fluid chamber comprises two distinct portions, a piston portion delimited by and provided between the piston and the fixation element and an effective portion delimited by and provided between the engagement element and the support element which are fluid-communicatively connected via two connecting bores provided in the engagement element. In this configuration, the effective portion is disposed around the engagement element along a circumferential direction thereof and has an effective base area that is considerably larger compared to an effective base area of the piston portion. The actuating force applied onto the piston is hydraulically transformed into a force acting on the fixation element which is higher compared to that one acting on the piston. By this configuration, an actuating force acting on the piston is transformed into a higher pulling force acting on the screw. In this way, the pulling force for tensioning the screw is generated by multiplying the actuating force applied to the piston.

In the known device, for venting the fluid chamber, i.e. for removing any gases therefrom, the fluid chamber is provided with a vent opening which is sealable by a screw. Specifically, the vent opening is provided such that it opens into the effective portion, i.e. from an upper side of the device. However, due to a flat arrangement of the effective portion of the fluid chamber, which is needed for adequately multiplying the actuating force, as well as the bulky design of the device, it may be arduous for an operator to properly remove gases from the fluid camber when venting the device by means of the vent opening.

SUMMARY OF THE INVENTION

In view of the prior art, it is an objective to provide a device for tensioning a connecting element having an improved operability.

This object is solved by means of a device for tensioning a connecting element having the technical features of claim 1. Preferred embodiments are set forth in the present specification, the Figures as well as the dependent claims.

Accordingly, a device is provided for tensioning a connecting element fastened to a component to be tightened which comprises an engagement element having an engagement section for receiving and holding the connecting element, a support element configured to support the device against the component, an actuating unit having a fluid chamber for receiving a fluid, wherein the actuating unit is configured to manipulate a volume of the fluid chamber so as to move the engagement element relative to the support element, and a vent opening fluid-communicatively connectable to the fluid chamber. The device is characterized in that the vent opening is disposed in the region of the engagement section.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying Figures. In the Figures, like elements are denoted by identical reference numerals and repeated description thereof may be omitted in order to avoid redundancies.

Figure 1:
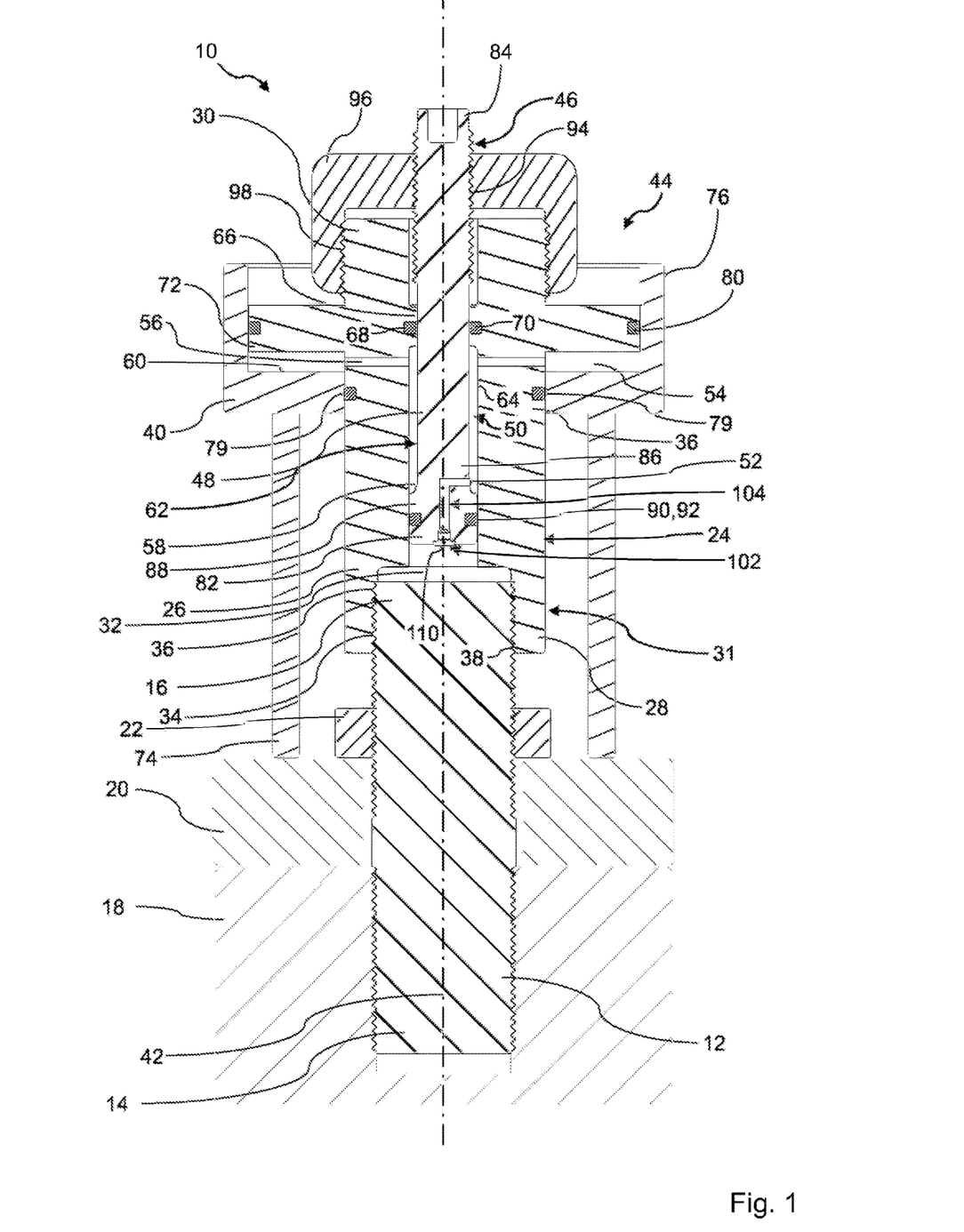
FIG. 1 schematically shows a sectional view of a device for tensioning a connecting element, and FIG. 2 schematically shows an enlarged sectional view of a head portion of a piston deployed in the device depicted in FIG. 1.

FIG. 1 schematically shows a device 10 for tensioning a connecting element 12 which forms a screw connection. The shown device 10 may be used for tensioning, i.e. preloading, and/or loosening, i.e. untighten, tensable screw connections. In the context of the present disclosure, the term "tensable" refers to a material property indicating that a component, i.e. the connecting element 12, at least partially, is capable of being elastically expanded and thus of storing an amount of elastic energy when being subjected to a tensioning force.

Specifically, the connecting element 12 is provided in the form of a screw comprising a first end 14, an opposed second end 16 and an elastic part positioned between the first end 14 and the second end 16. The elastic part is capable of being elastically lengthened when the connecting element 12 is subjected to a pulling force by means of the device 10.

The connecting element 12 is configured for connecting, i.e. frictional connecting, a first component 18 to a second component 20. Specifically, the first end 14 of the connecting element 12 is configured to be connected to the first component 18 by means of a threaded engagement, as depicted in FIG. 1. The elastic part of the connecting element 12 extends through the second component 20 such that the second end 16 of the connecting element 12 is positioned on a side of the second component 20 facing away from the first component 18. For connecting the first and the second component 18, 20, a nut 22 is provided which is in threaded engagement with the elastic part of the connecting element 12.

The device 10 comprises an engagement element 24 connectable to the connecting element 12. Specifically, the engagement element 24 includes a cylindrical portion 26 having a first end 28 and a second end 30. At the first end 28, the engagement element 24 is provided with an engagement section 31 for receiving and holding the connecting element 12, i.e. the second end 16 thereof. In other words, the engagement section 31 is provided for engaging with the connecting element 12 in a force- and/or form-fitting manner. Specifically, the engagement section 31 includes a cylindrical recess 32 to house the second end 16 of the connecting element 12. In other words, the engagement element 24 is provided with the recess 32 which forms the engagement section 31. The engagement section 31 includes internal threads 34 formed on a side wall 36 thereof to engage with complementary threads 38 formed at the second end 16 of the connecting element 12.

Further, the device 10 comprises a support element 40 configured to support the device 10 against the second component 20 and to translationally guide the engagement element 24 relative to the first and second component 18, 20. In other words, the engagement element 24 is translationally movable relative to the support element 40, i.e. along a longitudinal axis 42 of the device. Specifically, upon translationally moving the engagement element 24 relative to the support element 40, a tensioning force may be applied to or may be removed from the connecting element 12 fixed to the engagement element 24.

The device 10 further comprises an actuating unit 44 for translating a rotational movement applied to an actuating element 46 into a translational movement of the engagement element 24 relative to the first and second component 18, 20 to be tightened and thus relative to the support element 40. In other words, the actuating unit 44 is provided so as to actuate the engagement element 24 relative to the support element 40. In the following, the structure and operation of the actuating unit 44 will be explained in more detail.

The actuating unit 44 is hydraulically actuated. In other words, a hydraulic fluid is used to transfer motive power so as to move the engagement element 24 relative to the support element 40. Specifically, the actuating unit 44 comprises a fluid chamber 50 accommodating the fluid, wherein the actuating unit 44 is configured to manipulate a volume of the fluid chamber 50 so as to move the engagement element 24 relative to the support element 40. For doing so, the actuating unit 44 is provided with a piston 48 accommodated within and movable relative to the engagement element 24, i.e. along the longitudinal axis 42, wherein the fluid chamber 40 is delimited by the piston 48, the engagement element 24 and the support element 40.

In this configuration, the actuating unit 44 is designed such that a translational movement of the piston 48 manipulates the volume of the fluid chamber 50 and thereby moves the engagement element 24 with respect to the support element 40 so as to apply or remove a tension acting on the connecting element 12 connected to the engagement element 24.

More specifically, the fluid chamber 50 comprises two distinct portions, a piston portion 52 delimited by and provided between the piston 48 and the engagement element 24 and an effective portion 54 delimited by and provided between the engagement element 24 and the support element 40. The piston portion 52 and the effective portion 54 are fluid-communicatively connected via two connecting bores 56 provided in the engagement element 24. A base area 58 of the piston portion 52 is provided with an effective cross section that is smaller than an effective cross section of a base area 60 of the effective portion 54. In this context, the "effective cross section" refers to an area that is perpendicular to the longitudinal direction 42 and thus perpendicular to a moving direction of both the piston 48 and the engagement element 24 relative to the support element 40. By this configuration, an actuating force applied onto the piston 48 is hydraulically transformed into a force acting on the engagement element 24 that is higher compared to the actuating force acting on the piston 48.

For accommodating the piston 48, the engagement element 24 further includes a bore 62 extending along the longitudinal axis 42 of the device 10. Specifically, the bore 62 extends from the second end 30 of the cylindrical portion 26 to the recess 32 formed at the first end 28 of the cylindrical portion 26 of the engagement element 24 and is configured to receive the piston 48. A diameter of the bore 62 may be less than the diameter of the recess 32 which thus together form a stepped opening within the engagement element 24. Further, the bore 62 includes a variable diameter along the longitudinal axis 42. In other words, a wall of the engagement element 24 has a variable width along the length of the bore 62 such that the diameter of the bore 62 changes along the length of the bore 62. As depicted in FIG. 1, the bore 62 includes a wider portion 64 and a narrower portion 66. At the wider portion 64, a distance between the piston 48 and the wall of the engagement element 24 is greater than at the narrower portion 66.

As shown in FIG. 1, at the narrower portion 66, the piston 48 contacts the wall of the engagement element 24. The narrower portion 66 includes a groove 68 formed in the wall of the engagement element 24 which extends along a perimeter of the bore 62. A first sealing ring 70 is disposed in the groove 68 to form a seal joint between the piston 48 and the engagement element 24. The first sealing ring 70 is positioned between the piston 48 and the wall of the engagement element 24.

The engagement element 24 also includes a plate 72 extending radially from the cylindrical portion 26 of the engagement element 24. The plate 72 is positioned normal to the longitudinal axis 42 and is proximal to the second end 30 of the engagement element 24. The plate 72 is cylindrical in shape and forms a flange portion in proximity to the second end 30 of the engagement element 24.

The engagement element 24 is received at least partly within the support element 40. As set forth above, the engagement element 24 is arranged and adapted to be moved relative to the support element 40 to apply tension to or remove tension from the connecting element 12. The support element 40 includes a first cylindrical portion 74 and a second cylindrical portion 76 connected to one another by a connection portion 78. The first cylindrical portion 74 forms a lower part of the support element 40 to be positioned on the second component 20. The first cylindrical portion 74 surrounds a part of the connecting element 12, the first end 28 of the engagement element 24 and a portion of the cylindrical portion 26 of the engagement element 24. Specifically, the first cylindrical portion 74 surrounds the portion of the cylindrical portion 26 which is positioned underneath the plate 72 in the illustration depicted in FIG. 1.

The second cylindrical portion 76 is spaced away from the first cylindrical portion 74 by the connection portion 78. The second cylindrical portion 76 surrounds the plate 72 of the engagement element 24 such that an inner surface of the second cylindrical portion 76 contacts an outer surface of the plate 72. In other words, the plate 72 is positioned within the second cylindrical portion 76 of the support element 40 and is configured to move relative to the second cylindrical portion 76.

Further, a third sealing ring 80 is positioned between the inner surface of the second cylindrical portion 76 and the outer surface of the plate 72 to prevent leakage of the fluid accommodated in the fluid chamber 50. Specifically, the third sealing ring 80 may be positioned in a groove formed either into the inner surface of the second cylindrical portion 76 or into the outer surface of the plate 72, as depicted in FIG. 1

As can be gathered from FIG. 1, the first cylindrical portion 74, the second cylindrical portion 76, and the connection portion 78 are hollow cylindrical portions having inner diameters different from each other, thereby forming stepped configurations with each other. The inner diameter of the connection portion 78 is smaller than the inner diameters of both the first cylindrical portion 74 and the second cylindrical portion 76. The connection portion 78 comprises an opening to guide the engagement element 24 within the support element 40, which opening has a diameter slightly larger than the diameter of the portion of the engagement element 24 guided by the support element 40. The connection portion 78 may further define a recess in which a second sealing ring 79 may be disposed for providing a sealing between the engagement element 24 and the connection portion 78.

The plate 72, the connection portion 78, and the second cylindrical portion 76 of the support element 40 together form the effective portion 54 of the fluid chamber 50. The effective portion 54 is fluidly connected to the bore 62 in the engagement element 24 via the connecting bores 56. The effective portion 54 is configured to receive the fluid from the piston portion 52 accommodated in the bore 62 of the engagement element 24 due to an axial movement of the piston 48 slidably positioned within the engagement element 24.

In this way, the fluid may move back and forth between the piston portion 52 and the effective portion 54 of the fluid chamber 50. During operation, the position of the piston 48 determines how much fluid is displaced from the piston portion 52 to the effective portion 54, and vice versa. As can be gathered from FIG. 1, when the piston 48 is moved in an upward direction, i.e. in a direction facing away from the engagement element 24, the size of the piston portion 52 gets smaller. Accordingly, fluid is displaced therefrom into the effective portion 54 causing an increase of pressure in the effective portion 54 as more and more fluid enters thereinto. This pressure acts on the engagement element 24 which causes it to move in a direction facing away from the support element 40, i.e. along the longitudinal axis 42. This movement induces tensioning and thus lengthening of the connecting element 12. In this tensioned and lengthened state of the connecting element 12, an operator may tighten the nut 22 so as to position the nut 22 closer to the second component 20, i.e. to abut on the second component 20. This may be performed by reaching the nut 22 through openings in the support element 40 with a tool, an end of which may be inserted into the openings at the side of the nut 22 to turn and thus tighten or loosen the nut 22.

The piston 48 has a generally cylindrical shape with a head end 82 and a rod end 84 that are distal to one another and connected by a shaft 86. The head end 82 has a sealing portion 88 that is larger in diameter than the shaft 86. The diameter of sealing portion 88 corresponds to a diameter of the bore 62 in the engagement element 24. The sealing portion 88 comprises a recess 90 that is circular in nature. A fourth sealing ring 92 is provided within the recess 90.

The first to fourth sealing ring 70, 79, 80, 92 may be made from metal, such as iron or steel, ceramics, fibrous materials, elastomer and/or plastic.

The piston 48 further includes a threaded portion 94 that is in threaded engagement with a cap 96 of the engagement element 24. The cap 96 is firmly fixed to the second end 30 of the cylindrical portion 26 by means of a threaded connection 98. Alternatively, the cap 96 may be pressed to the second end 30 of the cylindrical portion 26 of the engagement element 24.

In the shown configuration, the actuating element 46 is formed by the rod end 84 of the piston 48. As the piston 48 and thus the actuating element 46 are connected to the cap 96 by means of a threaded engagement, the actuating unit 44 is designed such that a rotational movement of the actuating element 46 is transformed into a translational movement of the piston 48 relative to the engagement element 24 which manipulates a volume of the fluid chamber 50 and thereby moves the engagement element 24 with respect to the support element 40. As a result, upon rationally manipulating the actuation element 46, a tensioning or loosening of the connecting element 12 connected to the engagement element 24 is performed by means of the device 10. Further, the effective portion 54 of the variable fluid chamber 50 is fluidly connected to a pressure metering device (not shown) for determining a pressure of the fluid present in the effective portion 54.

Figure 2:
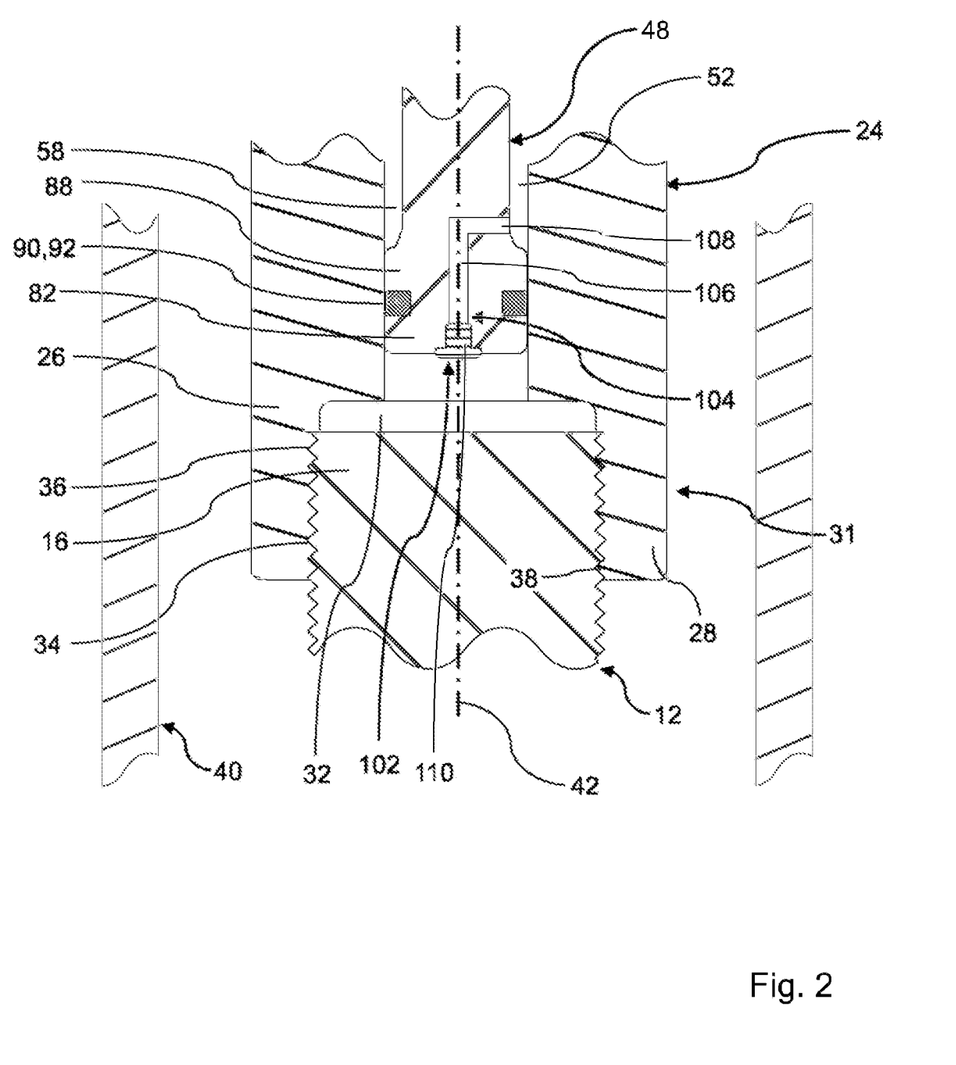

As shown in FIG. 2, the device 10 further comprises a vent opening 102 which is arranged in the region of the engagement section 31 and which is fluid-communicatively connectable to the fluid chamber 50. Specifically, the vent opening 102 is arranged within the engagement element 24 and is provided such that the fluid chamber 50 is fluid-communicatively connectable to the engagement section 31 via the vent opening 102. In other words, gases or fluid accommodated in the fluid chamber 50 may be discharged into the engagement section 31 via the vent opening 102.

In the shown configuration, the vent opening 102 is provided in the head end 82 of the piston 48, i.e. at an end surface of the piston 48 which faces the engagement section 31. Thus, the vent opening 102 opens into the engagement section 31, i.e. via the bore 62. Further, in the shown state of the device 10, in which the connecting element 12 is engaged with the engagement section 31, the vent opening 102 faces the connecting element 12.

Further, the device 10 is provided with a vent duct 104 for fluid-communicatively connecting the vent opening 102 to the fluid chamber 50. The vent duct 104 is provided in the piston 48 and comprises a first portion 106 and a second portion 108. The first portion 106 extends from the vent opening 102 in a direction parallel to the longitudinal direction 42 within the head end 82 of the piston 48. The second portion 108 extends from the first portion 106 in a direction perpendicular to the longitudinal axis 42 and opens into the piston portion 52 of the fluid chamber 50. In other words, the vent duct 104 is directly connected to the piston portion 52 of the fluid chamber 50.

As can be gathered from FIG. 2, a locking element 110 is provided for releasably closing the vent opening 102 and thus releasably sealing the vent opening 102, the vent duct 104 and the fluid chamber 50. For doing so, the locking element 110 is releasably connected to the vent opening 102 and the vent duct 104 and thus to the head end 82 of the piston 48 by means of a threaded engagement.

Specifically, the locking element 110 is provided in the form of a safety valve, in particular a relief valve or a pressure relief valve, and is configured to open when a pressure prevailing in the fluid chamber 50 exceeds a predetermined threshold value. In other words, the locking element 110 in the form of the safety valve is configured to discharge fluid from the fluid chamber 50 via the vent opening 102 when a pressure of the fluid prevailing in the fluid chamber 50 exceeds the predetermined threshold value.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A device may be provided for tensioning a connecting element fastened to a component to be tightened. The device may comprise an engagement element having an engagement section for receiving and holding the connecting element, a support element configured to support the device against the component, an actuating unit having a fluid chamber for receiving a fluid, wherein the actuating unit is configured to manipulate a volume of the fluid chamber so as to move the engagement element relative to the support element, and a vent opening which is fluid-communicatively connectable to the fluid chamber. The vent opening may be disposed in the region of the engagement section.

Generally, for properly venting the fluid channel of the device, an operator should position the device such that the vent opening is arranged at a higher position relative to the fluid chamber. It has been found that this can be ensured well when the vent opening is positioned in the region of the engagement section. As to substance, for ensuring a good accessibility when connecting the engagement element to the connecting element to be tightened, the engagement section of known devices is typically provided in the region of a protruding portion of the device. Accordingly, by disposing the vent opening in the region of the engagement section, the vent opening is likewise arranged in the region of the protruding portion of the device. Thus, when the operator positions the device such that the engagement element is pointing upwards, i.e. by arranging the device upside down, it can be conveniently ensured that the vent opening is arranged at a higher position relative to the fluid chamber and thus that the device can be vented properly. As a result, the proposed configuration simplifies a venting operation of the device for an operator, thereby improving the device's operability.

Generally, the proposed device may be used, for example, in the field of steel constructions and various engine design applications, but is not limited to these applications. Rather, the proposed device may be used in any application in which connecting elements are tightened by employing torque-free tensioning methods. In one example, the proposed device may be used to fasten a turbo charger to an engine crank case.

Specifically, the device may be used for tensioning and/or loosening a connecting element. In other words, the device may be used to preload and/or untighten a connecting element. The connecting element may be a tensable connecting element. For example, the connecting element may be or comprise a screw, a bolt and/or any other type of tensable connecting elements.

Further, the connecting element to be tensioned and/or loosened by the proposed device may be intended and/or configured to tighten a component to which it is fastened. Alternatively or additionally, the connecting element to be tensioned and/or loosened by the proposed device may be intended and/or configured for connecting, i.e. frictional connecting, a first component to a second component. Accordingly, the device may be configured for tensioning a connecting element for connecting, i.e. frictional connecting, a first component to a second component. For doing so, a first end of the connecting element may be fixed to the first component, i.e. by means of a threaded engagement. For example, the first component may be an engine crank case and the second element may be a turbo charger mount.

As set forth above, the device may comprise the engagement element connectable to the connecting element. In other words, the engagement element is configured for being connected to the connecting element, i.e. in a force- and/or form-fitting manner. For doing so, the engagement element may comprise the engagement section for engaging with the connecting element, in particular in a force- and/or form-fitting manner. Specifically, the engagement section may be engaged with the connecting element by means of a threaded engagement. The engagement section may be provided at an end portion of the engagement element. Further, the engagement section may be configured to engage with a second end of the connecting element arranged opposed to the first end thereof. For example, the engagement section may be provided with a thread designed complementary to a thread formed at the second end of the connecting element.

More specifically, the engagement element may be provided with a recess, i.e. a cylindrical recess, which forms the engagement section. The recess may be provided at a front end of the engagement element. The engagement section may comprise at least one side wall formed by the recess which, i.e. on their inner side, may be provided with an engagement element for being connectable to the connecting element in a force- and/or form-fitting manner. For example, the at least one side wall may be provided such that it includes internal threads formed on an inners surface thereof to engage with complementary threads formed at the second end of the connecting element.

As set forth above, the vent opening may be arranged in the region of the engagement section. Specifically, the vent opening may be arranged within or adjacent to the engagement section. Alternatively, the vent opening may be arranged nearby or in the proximity of the engagement section.

For example, the vent opening may be arranged within the engagement element. Further, the vent opening may be provided such that the fluid chamber is fluid-communicatively connectable to the engagement section via the vent opening. In other words, gases or fluid accommodated in the fluid chamber may be discharged from the fluid chamber into the engagement section via the vent opening. For example, the vent opening may be provided such that it opens into the engagement section. In this way, upon being discharged from the fluid chamber via the vent opening, gases or fluid may be guided into the engagement section.

Alternatively or additionally, the device may be provided such that, in a state, in which the connecting element is engaged with the engagement element, i.e. the engagement section, the vent opening faces the connecting element. In this way, upon flowing through the vent opening, gases or fluid being discharged from the fluid chamber are guided towards the connecting element and/or the engagement section.

Further, the device may comprise a vent duct for fluid-communicatively connecting the vent opening to the fluid chamber. The vent duct may form a part of a flow section for a fluid being discharged from the fluid chamber, i.e. to the engagement section, via the vent opening. Accordingly, when fluid is discharged from the fluid chamber, it may, at first, flow thorough the vent duct prior to being guided through the vent opening. The vent duct may be arranged adjacent to and/or downstream of the vent opening. In this context, the term "downstream" refers to a flow direction of a fluid being discharged from the fluid chamber via the vent duct and vent opening. Further, the vent duct may be provided such that it opens into the fluid chamber. Accordingly, the vent duct may fluid-communicatively connect the fluid chamber to the vent opening. Specifically, the vent duct may extend from the vent opening in a direction parallel to a longitudinal axis of the device and/or the engagement element. The vent duct may be directly connected to the vent opening and the fluid chamber.

As set forth above, the device may comprise the support element configured to support the engagement element against the component to be tightened. In other words, the support element is configured to, during the tensioning operation of the device, abut on the component to be tightened, i.e. on the first or the second component. In this way, the support element is capable of generating a force, i.e. a reaction force, counteracting the pulling force exerted onto the connecting element connected to the engagement element during tension operation of the device.

The support element may be designed to translationally guide the engagement element. In other words, the engagement element may be translationally movable relative to the support element, i.e. along the longitudinal axis of the device, and thus relative to the component to be tightened.

Upon translationally moving the engagement element relative to the support element, a tensioning force may be applied to or may be removed from the connecting element fixed to the engagement element. Thus, the device may be provided such that the engagement element is translationally movable relative to the support element so as to apply a tension to or to remove a tension from the connecting element.

The device may be provided such that the engagement element, at least partly, is accommodated within the support element. For example, the support element may be provided with a cavity, i.e. a cylindrical cavity which particularly extends along the longitudinal axis of the device. The cavity may be configured to at least partially receive the engagement element, i.e. the engagement section thereof.

The device may further comprise an actuating unit for actuating the engagement element. Specifically, the actuating unit may be configured for translationally moving the engagement element relative to the support element and thus relative to the component to be tightened.

The actuating unit may be a hydraulically actuated or a hydraulically driven actuating unit. This means that the actuating unit may use a fluid for actuating the engagement element. In other words, a fluid is used to transfer motive power for the engagement element so as to move the engagement element relative to the component to be tightened and thus relative to the support element. For doing so, the actuating unit may comprise the fluid chamber containing for receiving the fluid which may be a hydraulic fluid.

As set forth above, the actuating unit is configured to manipulate the volume of the fluid chamber so as to move the engagement element relative to the support element. For manipulating the volume of the fluid chamber, the actuating unit may comprise an actuating means for applying pressure to and/or releasing pressure from the fluid accommodated the fluid chamber.

For example, the actuating unit may comprise a piston which is accommodated within and movable relative to engagement element and which partially defines to fluid chamber. Further, the fluid chamber accommodating the fluid may be defined or delimited at least partly by the piston and/or the engagement element and/or the support element. Specifically, the fluid chamber may at least partly be provided in a space between the piston and/or the engagement element and/or the support element. In this configuration, the actuating unit may be provided such that a translational movement of the piston manipulates a volume of the fluid chamber and thereby moves the engagement element with respect to the support element and thus with respect to the component to be tightened. For actuating the piston, the actuating unit may comprise an actuating element which may be actuated by the operator, i.e. by means of an electric or manual screwdriver. For example, the actuating unit may be configured for translating a rotational movement applied to the actuating element into a translational movement of the engagement element relative to the component to be tightened and thus relative to the support element. In other words, in the actuating unit, the actuating element and the piston may be arranged and interlinked to one another such that a rotational movement of the actuating element causes a translational movement of the piston, i.e. along the device's longitudinal axis, which manipulates the volume of the fluid chamber and thereby moves the engagement element relative to the component. One example of interlinking the actuating element and the piston is given by FIG. 1 and its accompanying description.

In a further development, the vent opening may be provided in the piston. Specifically, the vent opening may be provided at an end surface of the piston which faces the engagement section. Further, in the state, in which the connecting element is engaged with the engagement element, i.e. the engagement section, the end surface of the piston may face the connecting element.

The fluid chamber may comprise two distinct portions, namely a piston portion delimited by and provided between the piston and the engagement element and an effective portion delimited by and provided between the engagement element and the support element which are fluid-communicatively connected, i.e. via bores provided in the engagement element. An effective base area of the piston portion may be smaller than an effective base area of the effective portion which may be perpendicular to a movement direction of both the piston and the engagement element, i.e. perpendicular to the device's longitudinal axis. By such an arrangement, the actuating force applied onto the piston may be hydraulically transformed into a force acting on the engagement element which is higher compared to that one acting on the piston. In this way, the actuating unit transforms an actuating force into a pulling force acting on the connecting element which is multiplied compared to the actuating force the piston is exerted to.

In this configuration, the vent duct may open into the piston portion of the fluid chamber. In other words, the vent duct may be directly connected to the piston portion of the fluid chamber.

For ensuring proper operability during tensioning operation of the device, the vent opening and/or the vent duct may be sealable so as to seal, i.e. liquid- and air-tight seal the fluid chamber. In this way, i.e. during tensioning operation of the device, fluid accommodated within the fluid chamber is prevented from being discharged from the fluid chamber.

Specifically, the vent opening and/or the vent duct may be releasably sealable by means of a locking element. The locking element may be releasably connected to the vent opening and/or the vent duct so as to seal the fluid chamber. For example, the locking element may be releasably connected to the vent opening and/or the vent duct by means of a threaded engagement.

In a further development, the locking element may be a safety valve, in particular a relief valve or a pressure relief valve. Specifically, the safety valve may be configured to open and thus to relief pressure from the fluid chamber by discharging fluid therefrom when a pressure prevailing in the fluid chamber exceeds a predetermined threshold value.

INDUSTRIAL APPLICABILITY

The proposed device 10 may be used for fastening and/or loosening a tensable connecting element 12 to components to be tightened. The device 10 may be used in different fields of application, such as in steel constructions or engine design applications. In the following, the use of the device 10 for tightening and loosening a screw connection is described in more detail.

To connect a first component 18, e.g. a crank case, to a second component 20, e.g. a turbo charger mount, using a device 10 as shown in FIG. 1, the second component 20 is positioned next to the first component 18 and a connecting element 12 in the form of a screw is guided through a hole in the second component 20 and connected to the first component 18 by means of a threaded connection. As a result, the connecting element 12 extends from a side of the second component 20 which faces away from the first component 18. A nut 22 is screwed on the connecting element 12 from a first end 14 of the connecting element 12 which is arrange opposite to a second end 16 of the connecting element 12 positioned in and fastened to the first component 18.

Then, the device 10 is positioned over the connecting element 12 such that the connecting element 12 is housed by the support element 40. The support element 40 is placed on the second component 20. The engagement element 24 is positioned to introduce the connecting element 12 into the recess 32 to establish a threaded connection between the engagement element 24 and the first end 14 of the connecting element 12.

To apply a tension force to the connecting element 12, the actuating element 46 is rotationally actuated by using an electric or manual screwdriver. In this way, the piston 48 is translationally actuated relative to the engagement element 24 in a direction facing away from the second component 20. By moving the piston 48 in this direction, i.e. upwards, the piston portion 52 of the fluid chamber 50 decreases and hydraulic fluid is pushed therefrom into the effective portion 54 of the fluid chamber 50 via the connecting bores 56. As a result, the effective portion 54 increases in volume thereby exerting a pressure on the engagement element 24 which moves the same along the longitudinal axis 42 of the device 10 in respect to the support element 40. Accordingly, a distance between the engagement element 24 and the first and the second component 18, 20 increases, thereby tensioning and thus lengthening the connecting element 12.

In this tensioned condition of connecting element 12, for retaining the tension on the connecting element 12, the nut 22 is further tightened on the connecting element until the nut 22 abuts on the second component 20. This is performed by reaching through openings in the support element 40 with a tool, like a stick which end may be inserted in openings at the side of the nut 22 to turn the nut 22 on the connecting element 12 from the side.

For loosening a screw connection formed by the connecting element 12 and the nut 22, which was fastened by device 10 as described above, the support element 40 is positioned around the connecting element 12 on the second component 20. The exposed first end 14 of the connecting element 12 is fixed to the engagement element 24 by introducing the first end 14 of the connecting element in the recess 32 of the engagement element and connecting the first end 14 of the connecting element 12 with the engagement element 24 by a threaded engagement by means of complementary threads formed at the recess 32 of the engagement element 24 and the first end 14 of the connecting element 12.

To apply a tension force to the connecting element 12, the actuating element 46 is rotationally actuated by using an electric or manual screwdriver. As a result, the piston 48 is translationally actuated relative to the engagement element 24 in a direction facing away from the second component 20. By moving the piston 48 in this direction, i.e. upwards, the piston portion 52 of the fluid chamber 50 decreases and hydraulic fluid is pushed therefrom into the effective portion 54 of the fluid chamber 50 via the connecting bores 56. As a result, the effective portion 54 increases in volume thereby exerting a pressure on the engagement element 24 which moves the same along the longitudinal axis 42 of the device 10 in respect to the support element 40. Accordingly, a distance between the engagement element 24 and the first and the second component 18, 20 increases, thereby tensioning and thus lengthening the connecting element 12.

In a further step, the nut 22 positioned on the connecting element 12 is loosened using a tool reaching through an opening in the support element 40. After loosening the nut 22, the tension force applied to the connection element 12 is removed by rotationally actuating the actuating element 46 in a direction that is reversed compared to the rotational actuation of the same for generating the tension force as described above. As a result, the piston 48 is moved towards the second component 20, thereby increasing the piston portion 52 of the fluid chamber 50. Further, the effective portion 54 of the fluid chamber 50 decreases and the engagement element 24 moves towards the second component 20 and release the tension acting on the connecting element 12. Thereafter, the connecting element 12 is released from the engagement element 24, thereby removing the device 10 from the connecting element 12 and the first and second component 18, 20.

The invention claimed is:

1. A device for tensioning a connecting element fastened to a component to be tightened, comprising:
   an engagement element having an engagement section for receiving and holding the connecting element,
   a support element configured to support the device against the component,
   an actuating unit having a fluid chamber for receiving a fluid, wherein the actuating unit is configured to manipulate a volume of the fluid chamber so as to move the engagement element relative to the support element, and
   a vent opening fluid-communicatively connectable to the fluid chamber, characterized in that the vent opening is disposed proximate the engagement section, and opens into the engagement section.

2. The device according to claim 1, wherein the engagement element is provided with a recess which forms the engagement section.

3. The device according to claim 1, wherein the vent opening is arranged within the engagement element.

4. The device according to claim 1, wherein the fluid chamber is fluid-communicatively connectable to the engagement section via the vent opening.

5. The device according to claim 1, wherein in a state, in which the connecting element is engaged with the engagement section, the vent opening faces the connecting element.

6. The device according to claim 1, further comprising a vent duct for fluid-communicatively connecting the vent opening to the fluid chamber, wherein the vent duct extends from the vent opening in a direction parallel to a longitudinal axis of the device and/or the engagement element.

7. The device according to claim 1, in which the actuating unit further comprises a piston which is accommodated within and movable relative to the engagement element and which partially defines the fluid chamber, wherein the vent opening is provided in the piston.

8. The device according to claim 7, wherein the vent opening is provided at an end surface of the piston which faces the engagement section.

9. The device according to claim 7, in which the fluid chamber comprises a piston portion which is at least partially defined by the piston and the engagement element, wherein the vent duct opens into the piston portion.

10. The device according to claim 9, in which the fluid chamber further comprises an effective portion defined at least partially by the engagement element and the support element, wherein an effective base area of the piston portion is smaller than an effective base area of the effective portion.

11. The device according to claim 1, wherein the vent opening and/or the vent duct is releasably sealable by means of a locking element.

12. The device according to claim 11, wherein the locking element is releasably connected to the vent opening and/or the vent duct so as to seal the fluid chamber.

13. The device according to claim 11, wherein the locking element is a safety valve which is configured to open when a pressure prevailing in the fluid chamber exceeds a predetermined threshold value.

* * * * *